United States Patent [19]

Satoh

[11] Patent Number: 5,758,309
[45] Date of Patent: May 26, 1998

[54] COMBUSTION CONTROL APPARATUS FOR USE IN INTERNAL COMBUSTION ENGINE

[75] Inventor: Hiroshi Satoh, Kanagawa Pref., Japan

[73] Assignee: Nissan Motor Co., Ltd., Yokohama, Japan

[21] Appl. No.: 425,222

[22] Filed: Apr. 18, 1995

Related U.S. Application Data

[63] Continuation of Ser. No. 8,141, Jan. 25, 1993, abandoned.

[30] Foreign Application Priority Data

Feb. 5, 1992 [JP] Japan .................... 4-020273
Mar. 17, 1992 [JP] Japan .................... 4-060417

[51] Int. Cl.$^6$ ........................................ G06G 7/70
[52] U.S. Cl. .................... 701/108; 701/101; 701/102; 73/117.3; 123/568; 123/571
[58] Field of Search .................. 364/431.01, 431.07, 364/431.05, 431.08, 431.11, 569, 431.02; 73/117.3, 116, 35; 431/12, 76; 123/425, 479, 690, 48 R, 417, 438, 571, 698, 568, 436, 478, 419; 60/602, 39.03, 39.281, 600, 601, 603

[56] References Cited

U.S. PATENT DOCUMENTS

| | | | |
|---|---|---|---|
| 3,931,813 | 1/1976 | Horie et al. | 123/119 |
| 4,161,929 | 7/1979 | Nohira et al. | 123/119 |
| 4,478,199 | 10/1984 | Naraska et al. | 123/571 |
| 4,596,218 | 6/1986 | Karau et al. | 123/425 |
| 4,711,215 | 12/1987 | Chinpinski | 123/425 |
| 4,753,200 | 6/1988 | Kawamura et al. | 123/188 |
| 4,819,171 | 4/1989 | Morita | 364/431.08 |
| 4,821,194 | 4/1989 | Kawamura | 364/431.08 |
| 4,848,299 | 7/1989 | Satoh et al. | 123/435 |
| 4,970,667 | 11/1990 | Abo | 364/431.08 |
| 4,976,241 | 12/1990 | Ishida et al. | 123/425 |
| 5,001,645 | 3/1991 | Williams et al. | 364/431.08 |
| 5,021,960 | 6/1991 | Manaka et al. | 364/431.01 |
| 5,027,775 | 7/1991 | Iwata | 123/425 |
| 5,063,510 | 11/1991 | Jürgens et al. | 364/431.08 |
| 5,086,741 | 2/1992 | Nakamura et al. | 123/419 |
| 5,113,692 | 5/1992 | Kouta | 73/117.3 |
| 5,157,613 | 10/1992 | Williams et al. | 364/431.08 |
| 5,267,164 | 11/1993 | Miyama | 364/431.08 |
| 5,361,745 | 11/1994 | Suzuki et al. | 123/689 |
| 5,440,921 | 8/1995 | Matsuno et al. | 364/431.08 |

FOREIGN PATENT DOCUMENTS

| | | |
|---|---|---|
| 62-85148 | 4/1987 | Japan . |
| 63-246444 | 10/1988 | Japan . |
| 1-271651 | 10/1989 | Japan . |

*Primary Examiner*—Jacques H. Louis-Jacques
*Attorney, Agent, or Firm*—Foley & Lardner

[57] ABSTRACT

A combustion control apparatus includes a sensor sensitive to a combustion condition in at least one of the cylinders for producing a sensor signal indicative of a sensed combustion condition, and a control unit connected to the sensor for controlling an engine operating condition to adjust the combustion condition to a target value. A difference of the sensed combustion condition from the target value is calculated. An abnormal combustion indicative signal is produced when the calculated difference is negative value less than a limit value below which the combustion condition is degraded to an unacceptable extent. The engine operating condition is corrected at a first rate to maintain the target value of the combustion condition in the absence of the abnormal combustion indicative signal and at a second rate greater than the first rate in the presence of the abnormal combustion indicative signal.

5 Claims, 12 Drawing Sheets

COMBUSTION CONTROL APPARATUS FOR USE IN INTERNAL COMBUSTION ENGINE

This application is a continuation of application Ser. No. 08/008,141, filed Jan. 25, 1993, now abandoned.

BACKGROUND OF THE INVENTION

This invention relates to a combustion condition control apparatus for use with an internal combustion engine.

For example, Japanese Patent Kokai Nos. 62-85148, 63-246444 and 1-271651 disclose conventional combustion control apparatus for controlling the combustion of an air-fuel mixture in engine cylinders to an ideal condition. In Japanese Patent Kokai No. 62-85148, the combustion control is made by controlling the EGR ratio based upon a comparison of the sensed combustion condition (in this case combustion period) with an ideal pattern determined by engine speed and engine load. In Japanese Patent Kokai No. 63-24644, a so-called MBT spark timing control is made by detecting the engine crankshaft position $\theta_{pmax}$ at which the cylinder or combustion pressure is at maximum and correcting the spark timing by an amount so as to bring the engine crankshaft position $\theta_{pmax}$ to a target value. The combustion control is made by controlling the air/fuel ratio so as to bring the correction amount to zero. In Japanese Patent Kokai No. 1-271651, the combustion control is made by controlling the EGR ratio based upon detected cylinder pressure fluctuations (decentralization). Since the conventional combustion control apparatus have no means for dealing with an abnormal combustion condition, however, it is very difficult, if not possible, to adjust the EGR ratio while ensuring good engine operation stability under conditions where the EGR ratio approaches an upper limit above which good engine operation stability cannot be expected.

SUMMARY OF THE INVENTION

It is a main object of the invention to provide an improved combustion control apparatus which can ensure good engine operation stability even when the EGR ratio is controlled near an upper limit above which good engine operation stability cannot be expected.

There is provided, in accordance with the invention, a combustion control apparatus for use with an internal combustion engine having a plurality of cylinders. The combustion control apparatus comprises sensor means sensitive to a combustion condition in at least one of the cylinders for producing a sensor signal indicative of a sensed combustion condition, and a control unit connected to the sensor means for controlling an engine operating condition to adjust the combustion condition to a target value. The control unit includes means for calculating a difference of the sensed combustion condition from the target value, means for producing an abnormal combustion indicative signal when the calculated difference is a negative value less than a limit value below which the engine operation stability is degraded to an unacceptable extent, and means for correcting the engine operating condition at a first rate to maintain the target value of the combustion condition in the absence of the abnormal combustion indicative signal and at a second rate greater than the first rate in the presence of the abnormal combustion indicative signal.

In another aspect of the invention, there is provided an apparatus for checking an abnormal condition in an EGR system provided in an internal combustion engine for recirculating exhaust gases from an engine exhaust system into an engine intake system. The abnormal condition checking apparatus comprises sensor means sensitive to a combustion condition in at least one of the cylinders for producing a sensor signal indicative of a sensed combustion condition, means for providing a predetermined range defined by upper and lower limit values for each of combinations of engine operating conditions, and means for indicating an abnormal condition in the EGR system when the sensed combustion condition is out of the predetermined range.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
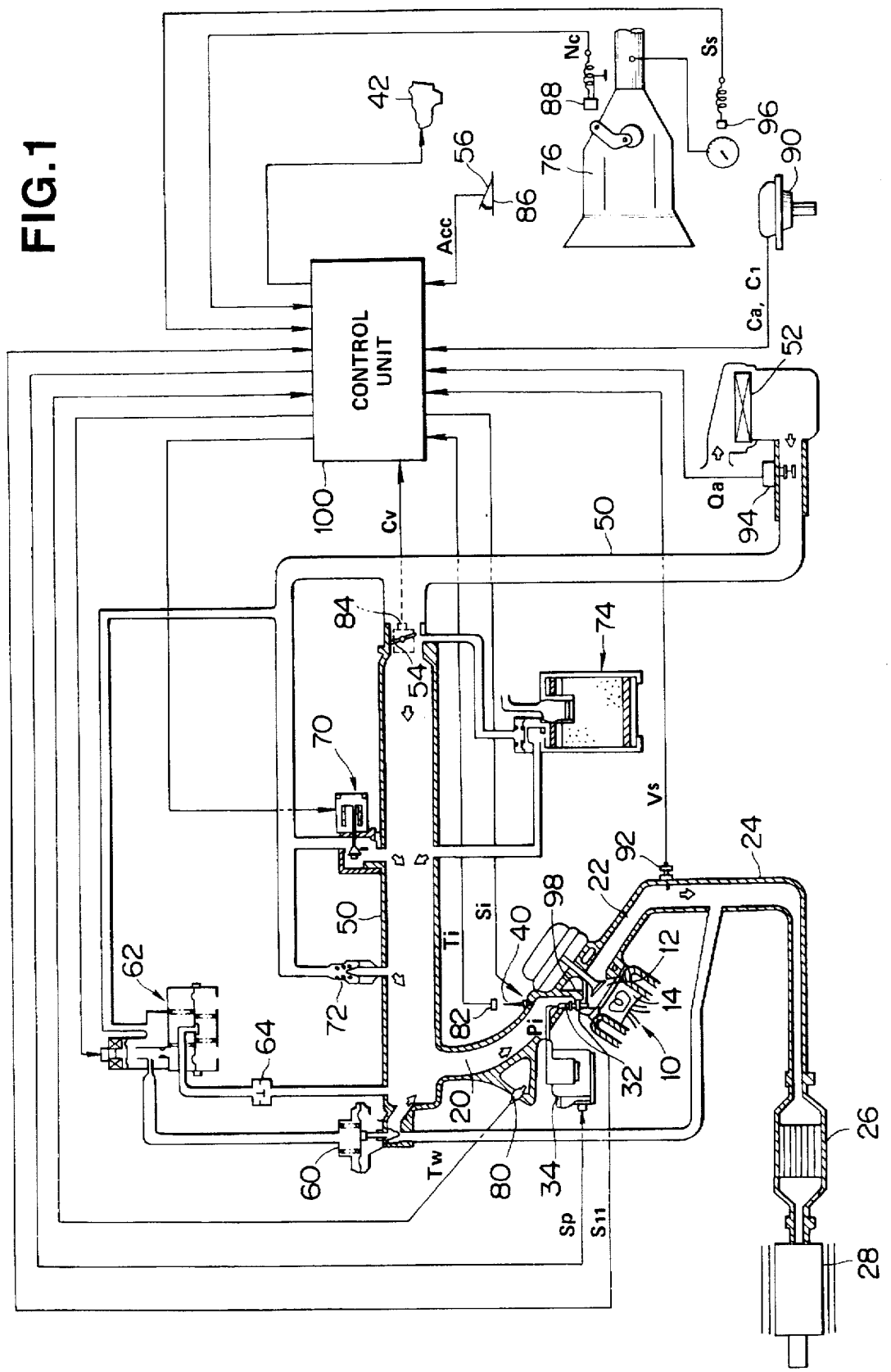
FIG. 1 is a schematic diagram showing one embodiment of a combustion control apparatus made in accordance with the invention.

With reference to the drawings and in particular to FIG. 1, there is shown a schematic diagram of an engine control system embodying the invention. An internal combustion engine, generally designated by the numeral 10, for an automotive vehicle includes a combustion chamber or cylinder 12. A piston 14 is mounted for reciprocal motion within the cylinder 12. A crankshaft (not shown) is supported for rotation within the engine 10 in response to reciprocation of the piston 14 within the cylinder 12. An intake manifold 20 is connected with the cylinder 12 through an intake port with which an intake valve is in cooperation for regulating the entry of combustion ingredients into the cylinder 12 from the intake manifold 20. A spark plug 32 is mounted in the top of the cylinder 12 for igniting the combustion ingredients within the cylinder 12 when the spark plug 32 is energized by the presence of high voltage electrical energy Pi from an ignition coil 34. An exhaust manifold 22 is connected with the cylinder 12 through an exhaust port with which an exhaust valve is in cooperation for regulating the exit of combustion products, exhaust gases, from the cylinder 12 into the exhaust manifold 22. The intake and exhaust valves are driven through a suitable linkage with the crankshaft.

A fuel injector 40 is connected to a fuel pump 42 which is also connected to a fuel tank (not shown). The fuel pump 42 is electrically operated to maintain sufficient pressure. The fuel injector 40 opens to inject fuel into the intake manifold 20 when it is energized by the presence of electrical current Si. The length of the electrical pulse, that is, the pulse-width, applied to the fuel injector 40 determines the length of time the fuel injector 40 opens and, thus, determines the amount of fuel injected into the intake manifold 20. Air to the engine 10 is supplied through an air cleaner 52 into an induction passage 50. The amount of air permitted to enter the combustion chamber 12 through the intake manifold 20 is controlled by a butterfly throttle valve 54 suitable within the induction passage 50. The throttle valve 54 is connected by a mechanical linkage to an accelerator pedal 56. The degree to which the accelerator pedal 56 is depressed controls the degree of rotation of the throttle valve 54. The accelerator pedal 54 is manually controlled by the operator of the engine control system.

In operation of the engine 10, fuel is injected through the fuel injector 40 into the intake manifold 20 and mixes with the air therein. The engine is of the conventional four-cycle type. When the intake valve opens, the air-fuel mixture enters the combustion chamber 12. An upward stroke of the piston 14 compresses the air-fuel mixture, which is then ignited by a spark produced by the spark plug 30 in the combustion chamber 12. Combustion of the air-fuel mixture in the combustion chamber 12 takes place, releasing heat energy, which is converted into mechanical energy upon the power stroke of the piston 14. At or near the end of the power stroke, the exhaust valve opens and the exhaust gases are discharged into the exhaust manifold 22. Most of the exhaust gases are discharged to the atmosphere through an exhaust system which includes an exhaust pipe 24, a catalytic converter 26 and a muffler 28. Some of the exhaust gases are recirculated to the combustion chamber 12 through an exhaust gas recirculation (EGR) system. The EGR system is constructed of the conventional parts of an EGR valve 60, a VCM valve 62 and a check valve 64. The VCM valve 62 determines the position of the EGR valve 60 and, thus, determines the amount of exhaust gases recirculated to the combustion chamber 12. An AAC valve 70 is provided to control the amount of air introduced into the induction passage 50 through a passage bypassing the throttle valve 54 at idle conditions where the throttle valve 54 is at its closed position. The numeral 72 designates a BC valve, the numeral 74 designates a canister, and the numeral 76 designates a transmission gear unit.

Although the engine 10 as illustrated in FIG. 1 shows only one combustion chamber 12 formed by a cylinder and piston, it should be understood that the engine control system described herein is designed for use on a multi-cylinder engine. Thus, it should be understood that there are at a total of six cylinders, intake valves, exhaust valves and reciprocating pistons, six spark plugs to ignite the air-fuel mixture within the combustion chambers if the engine to which the invention is applied is a six-cylinder engine. It is to be understood that the illustrated internal combustion engine 10 is shown and described only to facilitate a more complete understanding of the invention.

The amount of fuel metered to the engine, this being determined by the width of the electrical pulses Si applied to the fuel injector 40, the fuel-injection timing, the EGR valve position, and the ignition-system spark timing are repetitively determined from calculations performed by a digital computer, these calculations being based upon various conditions of the engine 10 that are sensed during its operation. These sensed conditions include cylinder-head coolant temperature, fuel temperature, throttle valve position, accelerator pedal position, transmission gear position, crankshaft position, exhaust oxygen content, intake air flow, engine speed, and cylinder combustion pressure. Thus, a cylinder-head coolant temperature sensor 80, a fuel temperature sensor 82, a throttle position sensor 84, an accelerator pedal position sensor 86, a transmission gear position sensor 88, a crankshaft position sensor 90, an oxygen sensor 92, a flow meter 94, an engine speed sensor 96, and cylinder pressure sensors 98 are connected to a control unit 100.

The cylinder-head coolant temperature sensor 80 preferably is mounted in the engine cooling system and comprises a thermistor connected in an electrical circuit capable of producing a DC voltage having a variable level proportional to coolant temperature. The fuel temperature sensor 82 preferably is a thermistor device connected in an electrical circuit capable of producing a DC voltage having a variable level proportional to fuel temperature. The throttle-valve and accelerator-pedal position sensors 84 and 86 are potentiometers electrically connected in voltage divider circuits for supplying DC voltages proportional, respectively, to throttle valve position and accelerator pedal position. The transmission gear position sensor 88 is responsive to the position of the transmission gear in neutral for generating a voltage signal. The crankshaft position sensor 90 produces a series of crankshaft position electrical pulses Cl each corresponding to two degrees of rotation of the engine crankshaft and a series of reference electrical pulses Ca at a predetermined number of degrees before the top dead center position of each engine piston. The oxygen sensor 92 monitors the oxygen content of the exhaust and is effective to provide a signal indicative of the air-fuel ratio at which the engine 10 is operating. The flow meter 94 is responsive to the air flow through the induction passage 50 to produce a signal proportional thereto. The engine speed sensor 96 produces a signal corresponding to the speed of rotation of the engine. Each of the cylinder pressure sensors 98 may include a force ring of the piezoelectric type. The force ring, which may be firmly secured to the engine by a spark plug or a cylinder head bolt tightened to rated torque, serves as a cylinder pressure signal source. The force ring generates a charge signal corresponding to the pressure exerted on the force ring.

The control unit 100 employs a digital computer which includes a central processing unit (CPU), a random access memory (RAM), a read only memory (ROM), a nonvolatile memory (NVM), and an input/output control unit (I/O). The center processing unit communicates with the rest of the computer via data bus. The input/output control unit includes an analog-to-digital converter, a crankshaft position counter, and an EGR valve control circuit. The analog-to-digital converter receives analog signals from the various sensors and it converts them into corresponding digital signals for application to the central processing unit. The A to D conversion process is initiated on command from the central processing unit which selects the input channel to he converted. The crankshaft position counter counts the crankshaft position pulses Cl for use in calculating the speed of rotation of the engine. The read only memory contains the program for operating the central processing unit and further contains appropriate data in look-up tables used in calculating appropriate values for EGR valve position. The look-up data may be obtained experimentally or derived empirically. A control word specifying a desired EGR ratio is periodically transferred by the central processing unit to the EGR valve control circuit which converts it into a control signal to the VCM valve 62 to control the EGR valve 60 in such a manner as to provide the desired EGR ratio calculated by the computer.

Figure 2:
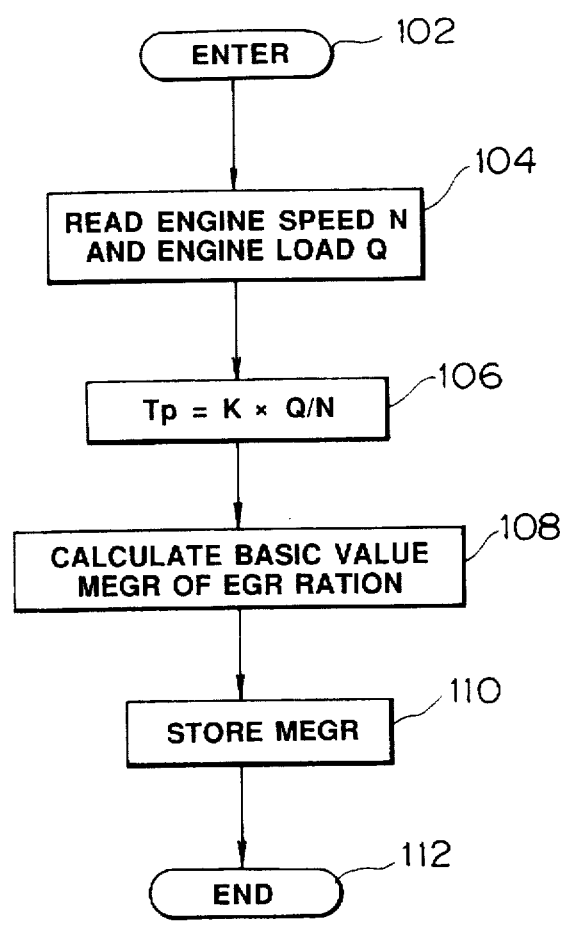
FIG. 2 is a flow diagram showing the programming of the digital computer as it is used to calculate a basic value for the EGR ratio.
Figure 3:
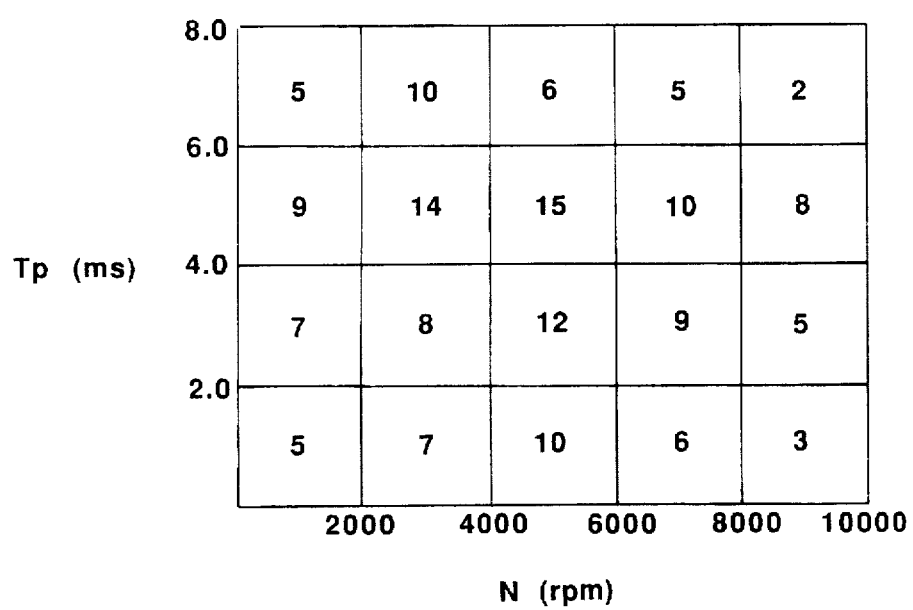
FIG. 3 is a diagram showing a relationship programmed into the digital computer, the relationship specifying basic EGR ratio as a function of engine speed and engine load.

FIG. 2 is a flow diagram illustrating the programming of the digital computer as it is used to calculate a basic value MEGR for the exhaust gas recirculation ratio. The computer program is entered at the point 102 at uniform intervals of time or in synchronism with engine rotation. At the point 104 in the program, the engine speed N and the intake air flow Q are read into the computer memory. At the point 106 in the program, the engine load Tp is calculated as Tp=K× Q/N where K is a constant. At the point 108 in the program, a basic value MEGR (%) for the recirculation (EGR) ratio from a relationship programmed into the computer. This relationship specifies the basic EGR ratio value MEGR as a function of engine speed N and engine load Tp, as shown in FIG. 3. At the point 110 in the program, the calculated basic EGR ratio value MEGR is stored in the computer memory. Following this, the program proceeds to the end point 112.

Figure 4:
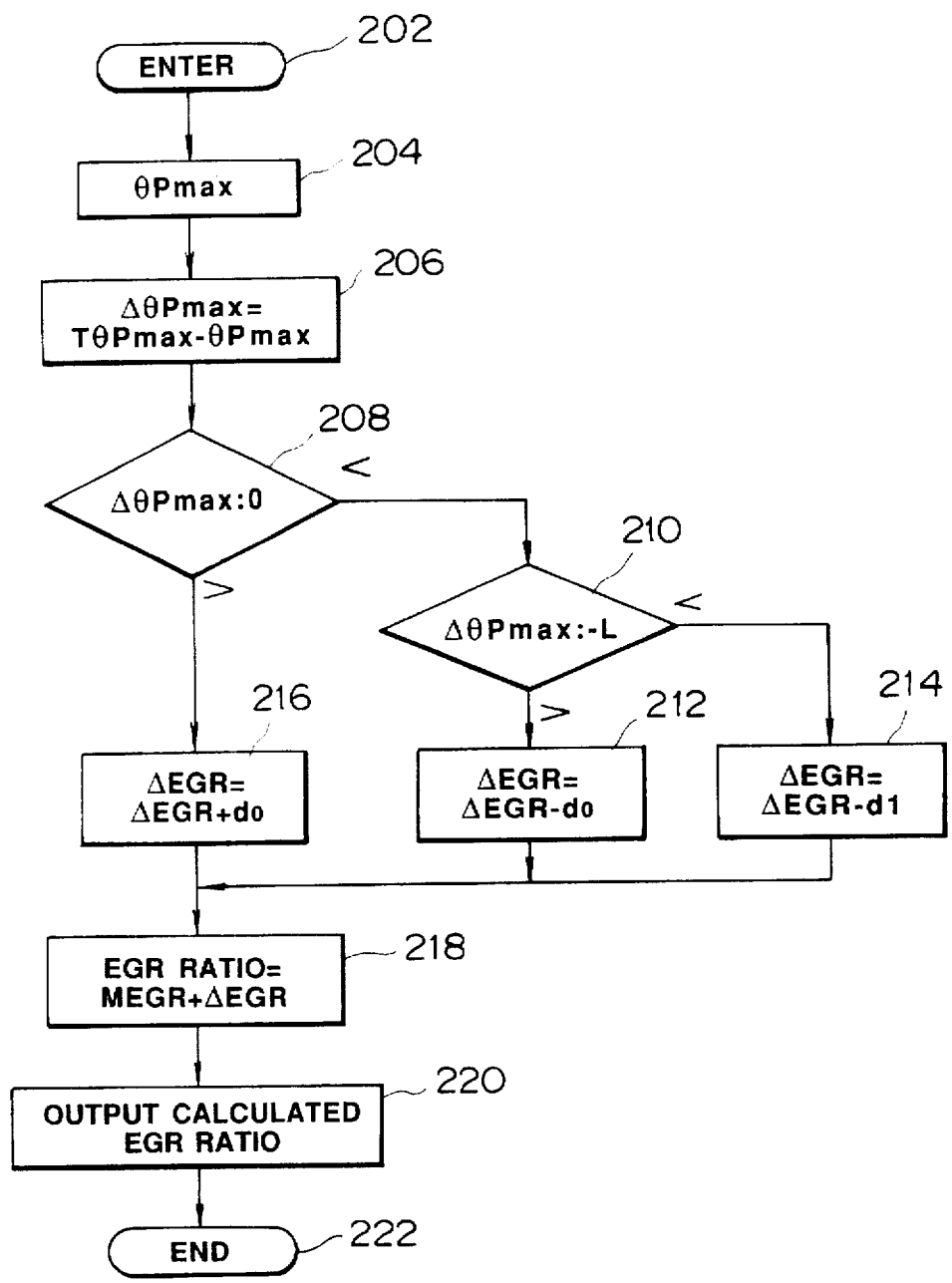
FIG. 4 is a flow diagram showing the programming of the digital computer as it is used to control the EGR ratio.
Figure 5:
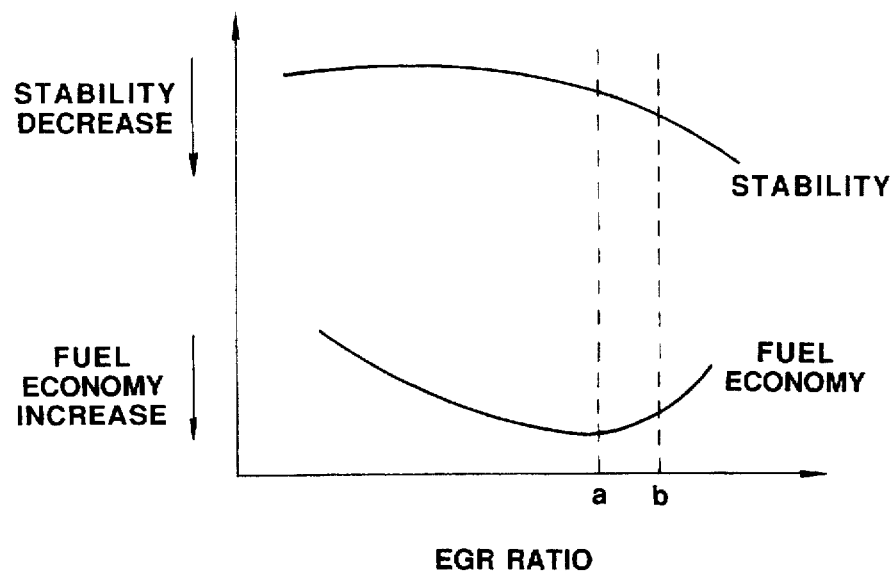
FIG. 5 is a graph of EGR ratio versus fuel economy.

FIG. 4 is a flow diagram illustrating the programming of the digital computer as it is used to control the EGR ratio. The computer program is entered at the point 202 at a predetermined number of degrees of rotation of the engine crankshaft to sample cylinder pressures during each of the combustion phases of at least one of the cylinders 12. At the point 204 in the program, the crankshaft position $\theta_{pmax}$ at which the cylinder pressure is at maximum is detected. This detection is made by sampling the cylinder pressure indication signal at uniform intervals within a predetermined number of degrees of rotation of the engine crankshaft after top dead center. At the point 206 in the program, a deviation $\Delta\theta_{pmax}$ of the crankshaft position $\theta_{pmax}$ from a predetermined target value $T\theta_{pmax}$ (for example, 15° after top dead center) is calculated.

At the point 208 in the program, the calculated deviation $\Delta\theta_{pmax}$ is compared with zero. If the calculated deviation $\Delta\theta_{pmax}$ is less than 0 (zero), then the program proceeds to another determination step at the point 210. In this determination, the calculated deviation $\Delta\theta_{pmax}$ is compared with a predetermined limit value −L. If the calculated deviation $\Delta\theta_{pmax}$ is greater than the limit value −L, then the program proceeds to the point 212 where the central processing unit updates the correction factor ΔEGR by subtracting a first predetermined value $d_0$ from the last value of correction factor ΔEGR and then to the point 218. If the calculated deviation $\Delta\theta_{pmax}$ is less than the limit value −L, then it means that an abnormal combustion occurs in the corresponding cylinder and the program proceeds to the point 214 where the central processing unit updates the correction factor ΔEGR by subtracting a second predetermined value $d_1$ which is greater than the first predetermined value $d_0$ from the last value of the correction factor ΔEGR and then to the point 218. If the calculated deviation $\Delta\theta_{pmax}$ is greater than zero, then the central processing unit updates the correction factor EGR by adding the first predetermined value $d_0$ to the last value of the correction factor ΔEGR. The first predetermined value $d_0$ may be a variable obtained as $d_0=k_0\times\Delta\theta_{pmax}$ where $k_0$ is a constant. In this case, the second predetermined value $d_1$ may be a variable obtained as $d_1=k_1\times\Delta\theta_{pmax}$ where $k_1$ is a constant greater than the constant $k_0$. Thus, the correction factor ΔEGR is corrected to a greater extent or at a greater rate under an abnormal combustion condition than under a normal combustion condition.

At the point 218 in the program, the central processing unit calculates a target value for the EGR ratio by adding the calculated correction ΔEGR to the basic value MEGR. At the point 220 in the program, the calculated target EGR ratio value is transferred to the EGR ratio control circuit of the input/output control unit. The EGR ratio control circuit controls the duty cycle of the control signal to the VCM valve 63 which thereby sets the EGR valve 60 at a position providing the EGR ratio calculated by the computer. Following this, the program proceeds to the end point 222.

Figure 6:
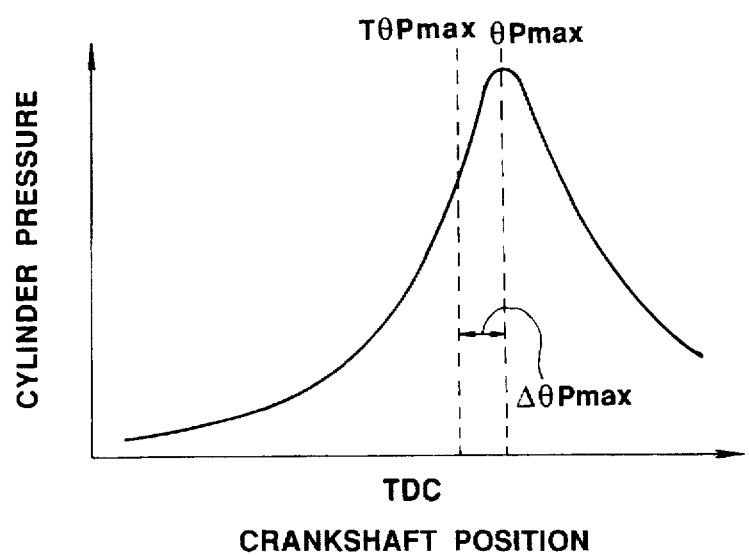
FIG. 6 is a graph of engine crankshaft position versus cylinder pressure.
Figure 7:
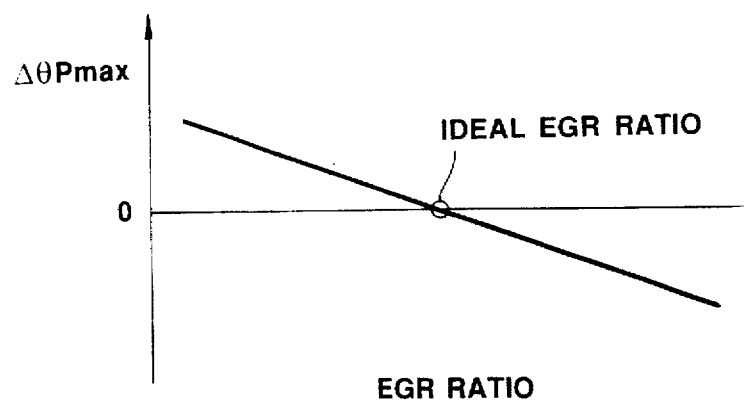
FIG. 7 is a graph of EGR ratio versus deviation $\Delta\theta_{pmax}$.
Figure 8:
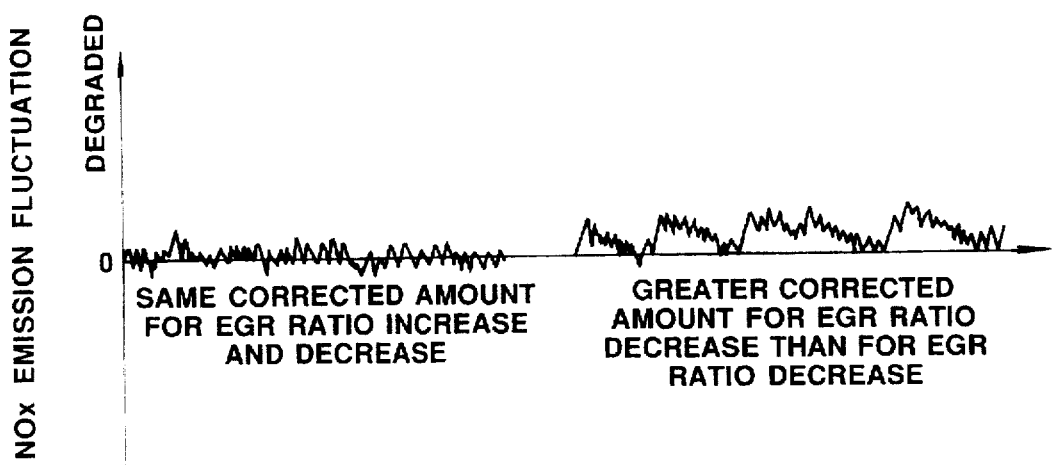
FIG. 8 is a graph used in explaining the effect on the NOx emission.

The operation of the combustion control apparatus of the invention will be described further with reference to FIG. 5 to FIG. 10. It is possible to obtain the maximum fuel economy by controlling the EGR ratio at its optimum value shown at a in FIG. 5. Since the optimum EGR ratio value approaches the limit, shown at b in FIG. 5, above which good combustion or engine operation stability cannot be expected, however, it is difficult to maintain the optimum EGR ratio without any feedback control to provide corrections for variations of the components used in the EGR system and their changes with time. FIG. 6 shows the waveform of the cylinder pressure indication signal fed from one of the cylinder pressure sensor 98. It is well known in the art that the maximum fuel economy can be obtained when the crankshaft angle $\theta_{pmax}$ at which the cylinder pressure P is at maximum meets with the target value $T\theta_{pmax}$ (for example, 15° after top dead center). The EGR ratio will meet with an ideal EGR ratio (basic EGR ratio) when the difference $\Delta\theta_{pmax}$ between the crankshaft angle $\theta_{pmax}$ and the target value $T\theta_{pmax}$ is equal to zero, as shown in FIG. 7. The EGR ratio is greater than the ideal EGR ratio when the difference $\Delta\theta_{pmax}$ is less than 0 and it is less than the ideal EGR ratio when the difference $\Delta\theta_{pmax}$ is greater than 0. It is, therefore, possible to control the EGR ratio to the ideal EGR value by correcting the EGR ratio according to the difference $\Delta\theta_{pmax}$. However, the engine operation stability would be degraded to an unacceptable extent when the EGR ratio deviates to a great extent over the ideal value. It is, therefore, required to promptly reduce the EGR ratio into a range where good engine operation stability can be maintained. For the purpose of this EGR ratio control, it may be considered that the correction factor ΔEGR should be decreased to a greater extent than the correction factor ΔEGR is increased. If, under normal combustion condition, the extent to which the correction factor ΔEGR is decreased is different from the extent to which the correction factor ΔEGR is increased, however, the EGR ratio correction factor will fluctuate, causing increased Nox emissions, as shown in FIG. 8. In order to ensure fuel economy and NOx emission reduction as well as engine operation stability, it is required to promptly decrease the EGR ratio only when an abnormal combustion condition is detected.

Figure 9:
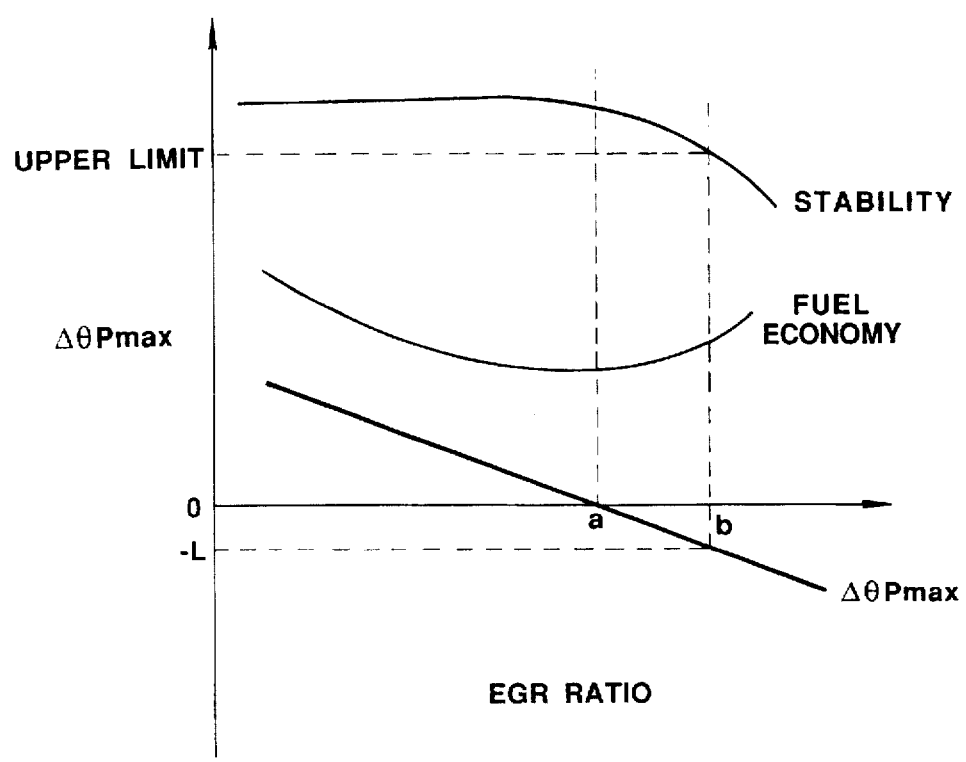
FIG. 9 is a graph of EGR ratio versus deviation $\Delta\theta_{pmax}$.

Although it may be considered, as proposed in Japanese Patent Kokai No. 1-271651, to detect the abnormal combustion condition when the decentralization of combustion fluctuations exceeds a predetermined value, this approach requires a long time for making measurements for a plurality of combustions and has a slow response. As a result, the unstable combustion remains for a long time. The invention is based upon the fact that the difference $\Delta\theta_{pmax}$ is equal to a predetermined limit value −L when the EGR ratio is at the limit b above which the engine operation stability is degraded to an unacceptable degree, as shown in FIG. 9. According to the invention, a greater value $d_1$ or $k_0$ is used when the difference $\Delta\theta_{pmax}$ is less than the limit value −L. As a result, the EGR ratio decreases by a greater amount in each cycle of execution of the program and, thus, at a greater rate under an abnormal combustion condition than under a normal combustion condition. The EGR ratio is decreased and increased at the same rate when the difference $\Delta\theta_{pmax}$ is greater than the limit value $-L$. The limit shown at b in FIGS. 5 and 9 may be defined as a point at which the CPi value, that is, the decentralization/average of the average effective pressure Pi or the HC emission is degraded 5%.

Figure 10:
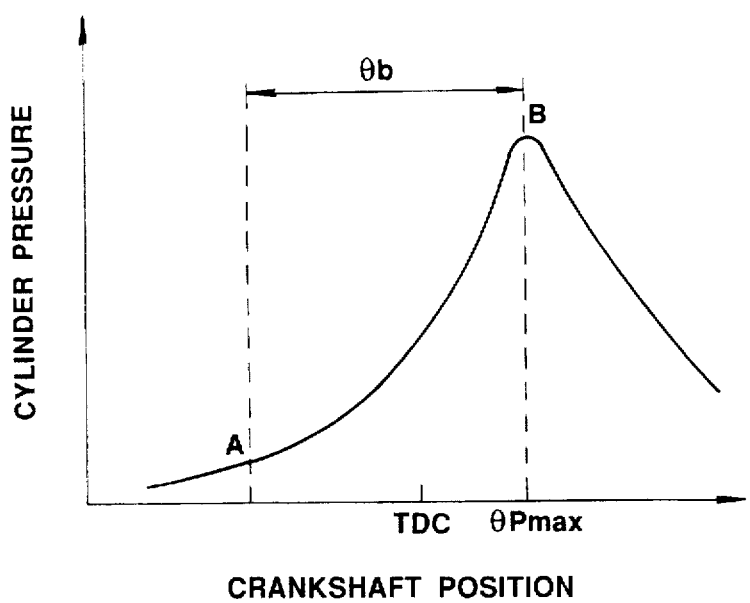
FIG. 10 is a graph of engine crankshaft position versus cylinder pressure.

Since the deviation or difference $\Delta\theta_{pmax}$ is produced because of fluctuations of the period $\theta b$ of combustion in the corresponding cylinder, that is, the interval between the time at which the air-fuel mixture is ignited and the time at which the cylinder pressure increases to its maximum value, as shown in FIG. 10, the difference $\Delta\theta_{pmax}$ may be replaced by a difference $\Delta\theta b = T\theta b - \theta b$ where $\theta b$ and $T\theta b$ are actual and ideal values for the combustion period. Alternatively when the control unit 100 includes an MBT spark timing control circuit of the type using a correction factor $\Delta ADV = \Delta ADV + k \times \Delta\theta_{pmax}$ to control the spark timing in a manner to bring the difference $\Delta\theta_{pmax}$ to zero, the correction factor $\Delta dADV$ may be used in place of the difference $\Delta\theta_{pmax}$. The cylinder pressure sensors 98 may be replaced with optical combustion sensors or combustion period sensors. The invention is also applicable to control the combustion condition by adjusting the air-fuel ratio of an air-fuel mixture introduced to the engine in place of the EGR ratio.

Figure 11:
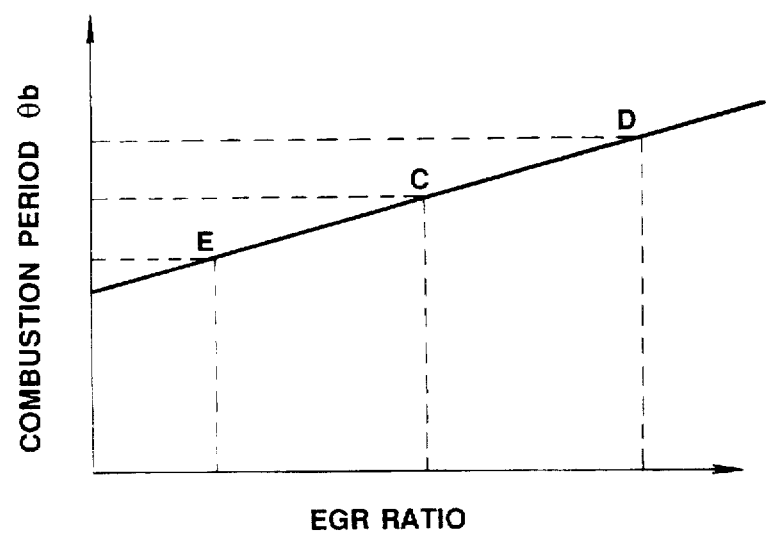
FIG. 11 is a graph of EGR ratio versus combustion period.

Assuming that the engine speed and load conditions are constant, the combustion period $\theta b$ increases as the EGR ratio increases, as shown in FIG. 11. The point C indicates a combustion period at an ideal EGR ratio. When the EGR ratio increases over the ideal value, the combustion period is prolonged, as indicated by the point D. When the EGR ratio decreases from the ideal value, the combustion period is shortened, as indicated by the point E. It is, therefore, possible to check the EGR device upon a comparison of the sensed combustion period $\theta b$ with combustion period values corresponding to the points D and E stored for engine operating conditions in terms of engine speed and load.

Figure 12:
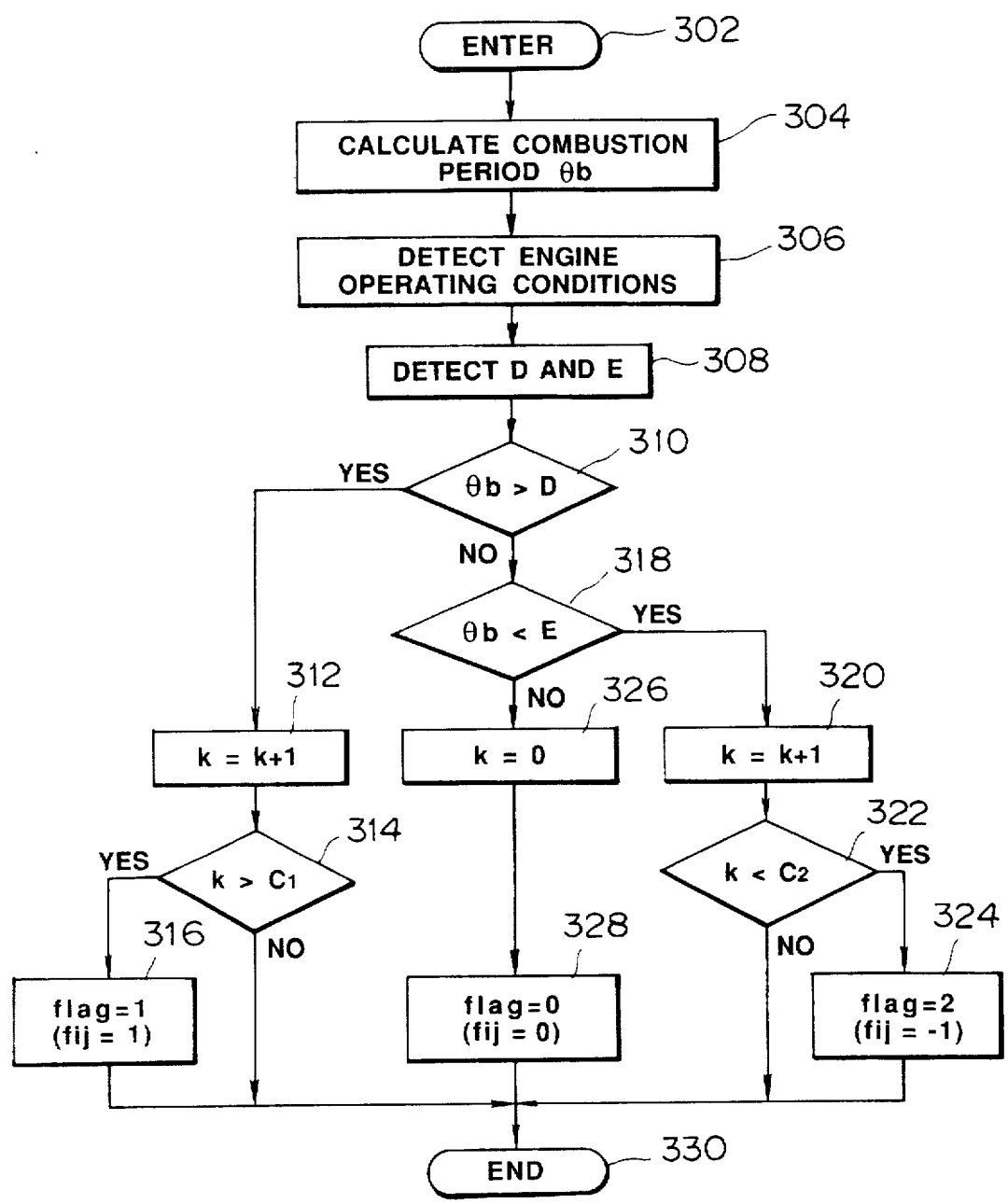
FIG. 12 is a flow diagram showing the programming of the digital computer as it is used to check an abnormal condition in the EGR system.

FIG. 12 is a flow diagram illustrating the programming of the digital computer as it is used to check an abnormal condition in the EGR device. The computer program is entered at the point 302 upon completion of combustion in at least one of the cylinders. At the point 304 in the program, the combustion period $\theta b$ is calculated. This calculation is made based upon the crankshaft position $\theta_{pmax}$ at which the cylinder pressure is at maximum. The crankshaft position $\theta_{pmax}$ is calculated in the same manner as described in connection with the point 204 of FIG. 4. At the point 306 in the program, a combination of engine operating conditions, for example, engine speed N and engine load Tp ($=K \times Q/N$), are read into the computer memory. At the point 308 in the program, the upper and lower limits D and E are calculated from a relationship programmed into the computer. This relationship defines the upper and lower limits D and E as a function of engine speed N and engine load Tp.

At the point 310 in the program, a determination is made as to whether or not the combustion period $\theta b$ is greater than the upper limit D. If the answer to this question is "yes", then it means that the EGR ratio is too great and the program proceeds to the point 312 where the count k of a counter is incremented by one step. At the point 314 in the program, a determination is made as to whether or not the count k is greater than a first predetermined value Cl. If the answer to this question is "yes", then the program proceeds to the point 316 where a flag is set at 1 to indicate that an abnormal condition occurs in the EGR system and then to the end point 330. Otherwise, the program proceeds from the point 314 directly to the end point 330.

If the combustion period $\theta b$ is equal to or less than the upper limit D, then the program proceeds from the point 310 to another determination step at the point 318. This determination is as to whether or not the combustion period $\theta b$ is less than the lower limit E. If the answer to this question is "yes", then it means that the EGR ratio is too small and the program proceeds to the point 320 where the count k of the counter is incremented by one step. At the point 322 in the program, a determination is made as to whether or not the count k is greater than a second predetermined value C2. If the answer to this question is "yes", then the program proceeds to the point 324 where the flag is set at 2 to indicate that an abnormal condition occurs in the EGR system and then to the end point 330. Otherwise, the program proceeds from the point 322 directly to the end point 330.

If the combustion period $\theta b$ is equal to or greater than the lower limit E, then it means that the EGR ratio is within a normal range and the program proceeds to the point 326 where the count k is cleared to zero. At the point 328 in the program, the flag is cleared to zero. Following this, the program proceeds to the point 330.

Figure 13:
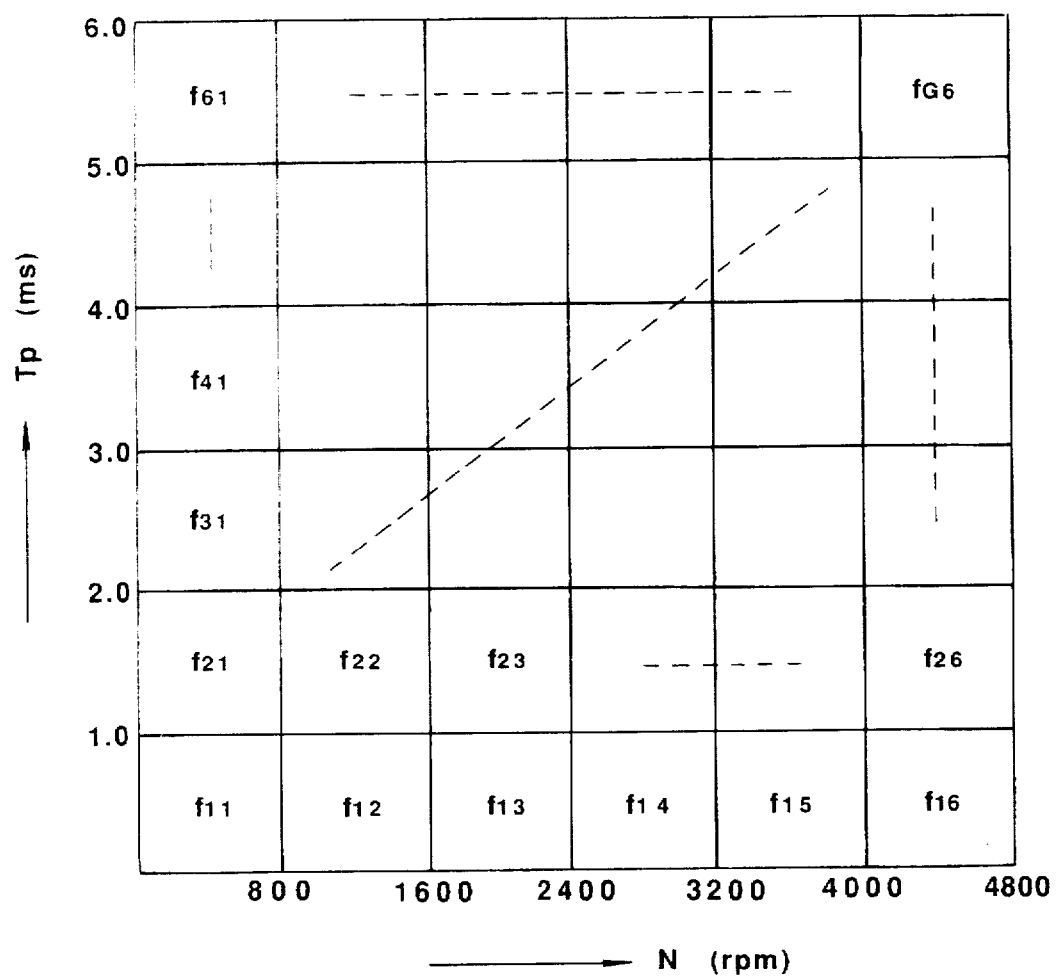
FIG. 13 is a diagram showing a relationship programmed into the digital computer.

At the points 316, 328 and 324 in the program, the EGR condition checking results fij where i relates to engine load Tp and j relates to engine speed N are stored in the random access memory to form a relationship, as shown in FIG. 13. At the point 316, fij=1 is stored in the random access memory to indicate that the EGR ratio is too great. At the point 328, fij=0 is stored into the random access memory to indicate that the EGR ratio is normal. At the point 324, fij=−1 is stored in the random access memory to indicate that the EGR ratio is too small.

The first and second predetermined values C1 and C2 are used at the points 314 and 322 to indicate an abnormal condition in the EGR system only when a plurality of abnormal conditions are continuously detected. This is effective to increase the reliability of the abnormal EGR condition checking operation made according to this program.

It is to be noted that the abnormal EGR condition checking operation may be made based upon a comparison of the crankshaft position $\theta_{pmax}$ with first and second predetermined positions. For example, it is determined that the EGR ratio is too great when a predetermined number of combustion conditions where the crankshaft position $\theta_{pmax}$ are retarded with respect to the first predetermined position repeated continuously and the EGR ratio is too small when a predetermined number of combustion conditions where the crankshaft position $\theta_{pmax}$ is advanced with respect to the second predetermined position are repeated continuously. When the control unit 100 includes a spark timing control circuit of the type correcting the spark timing in a manner to maintain a constant crankshaft position $\theta_{pmax}$, the combustion condition may be checked based upon the amount by which the spark timing is corrected. For example, it is determined that the EGR ratio is too great when a predetermined number of conditions where the spark timing is retarded with respect to a first predetermined value are repeated continuously. It is determined that the EGR ratio is too small when a predetermined number of conditions where the spark timing is advanced with respect to a second predetermined value are repeated continuously.

Figure 14:
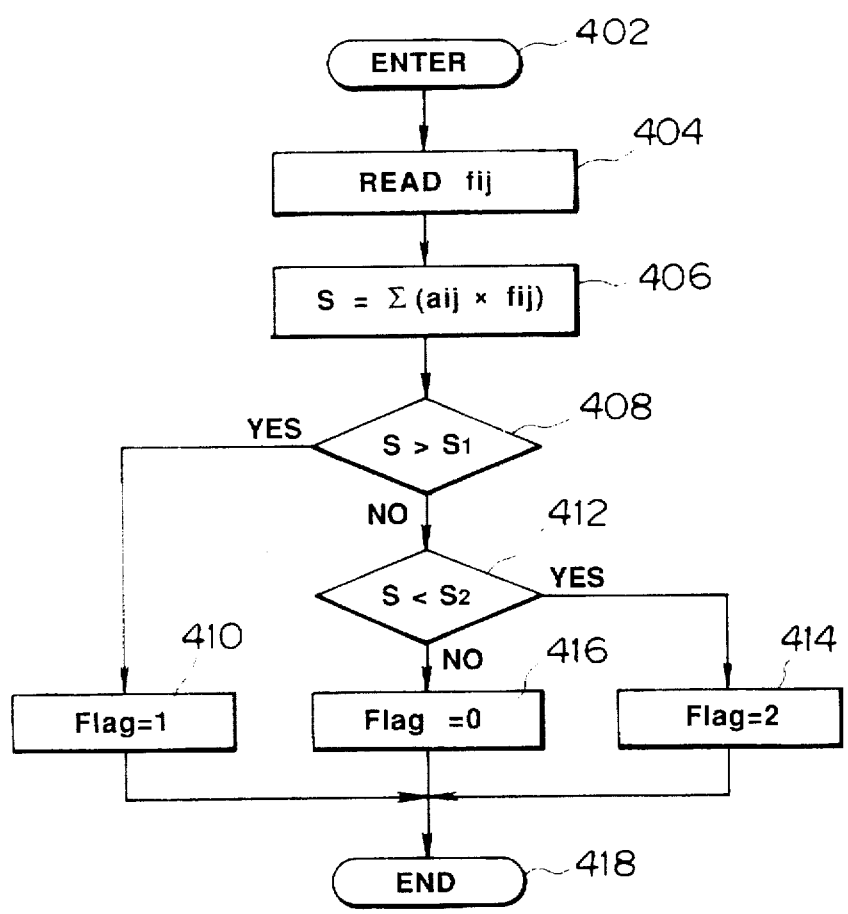
FIG. 14 is a flow diagram showing a modified form of the programming of FIG. 12.

FIG. 14 is a flow diagram illustrating a modified form of the programming of the digital computer as it is used to check an abnormal condition in the EGR system. The computer program is entered at the point 402 at uniform intervals of time (for example, 100 ms), or when the engine comes to a stop. At the point 404 in the program, the central processing unit reads all of the values fij (i=1 to 6, j=1 to 6) from the relationship, as shown in FIG. 13, and all of the weights aij (i=1 to 6, j=1 to 6). The weights are determined based upon the influences on the exhaust emissions. For example, the weight has a greater value under high-speed, high-load conditions than under low-speed, low-load conditions. That is, the weight has a great value under engine operating conditions where the amount of NOx emission is great since the abnormal condition of the EGR system will cause more serious problems under engine operating conditions where a great amount of NOx is discharged from the engine than under engine operating conditions where the Nox emission is small. At the point 406 in the program, the sum of values aij×fij is calculated as S=Σ (aij×fij) where i=1 to 6 and j=1 to 6.

At the point 408 in the program, a determination is made as to whether or not the calculated sum S is greater than a predetermined upper limit S1. If the answer to this question is "yes", then the program proceeds to the point 410 where a flag is set at 1 to indicate that the EGR ratio is too great. Following this, the program proceeds to the end point 418. If the calculated sum S is equal to or less than the upper limit S1, then the program proceeds to another determination step at the point 412. This determination is as to whether or not the calculated sum is less than a lower limit S2. If the answer to this question is "yes", then the program proceeds to the point 414 where the flag is set at 2 to indicate that the EGR ratio is too small. Following this, the program proceeds to the end point 418. If S2≦S≦S1, then the program proceeds from the point 412 to the point 416 where the flag is cleared to zero to indicate that the EGR ratio is normal. Following this, the program proceeds to the end point 418.

Figure 15:
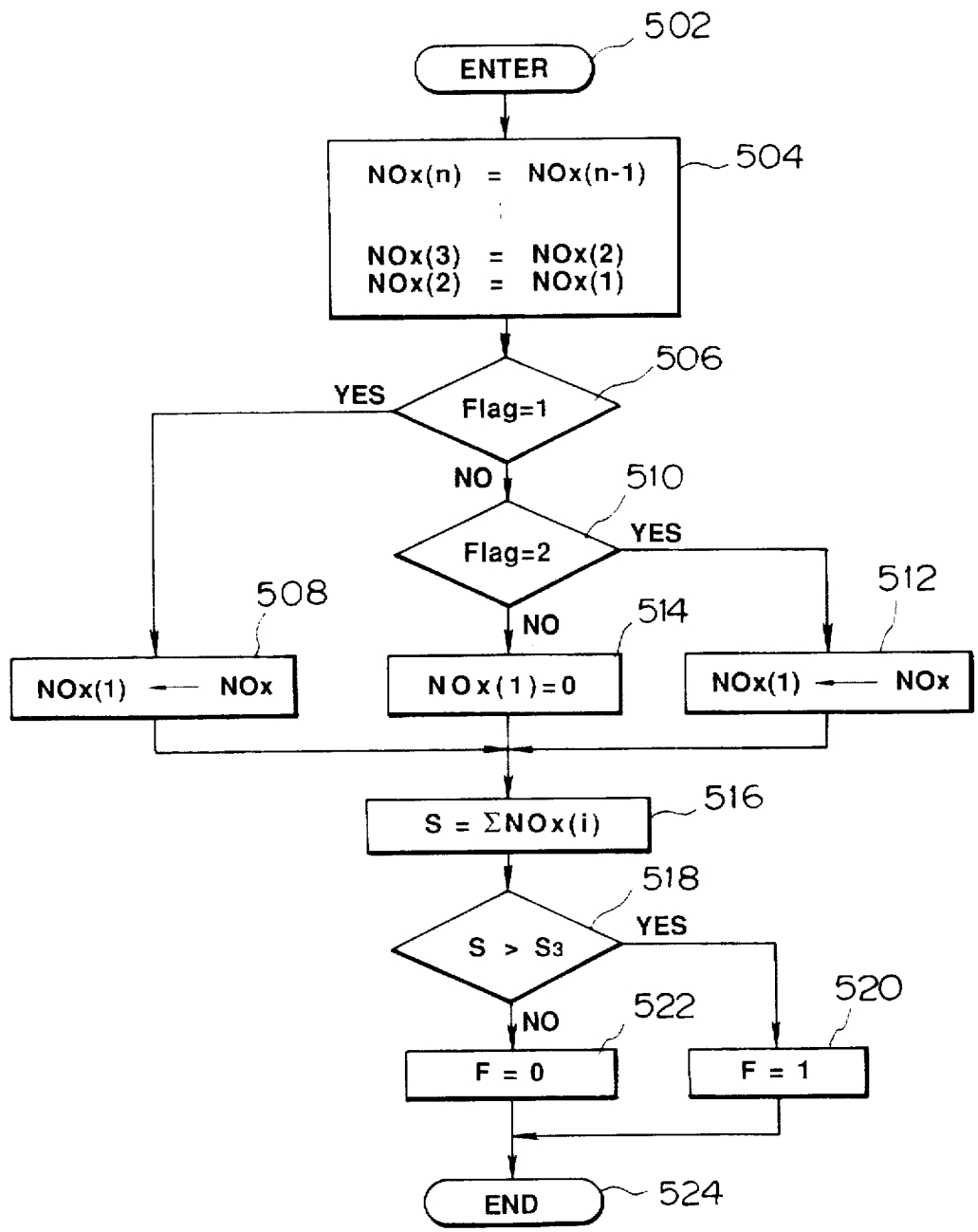
FIG. 15 is a flow diagram showing another modified form of the programming of FIG. 12.

FIG. 15 is a flow diagram of another modified form of the programming of the digital computer as it is used to check an abnormal condition in the EGR system. The computer program is entered at the point 502 at uniform intervals of time (for example 10 ms). Data NOx(i) (i=1 to n) which indicate increases or decreases in the amount of NOx discharged from the engine have been sampled for 10 minutes. At the point 405 in the program, the following processes are made:

NOx(i)←NOx(i−1) where i=n to 2

At the point 506 in the program, a determination is made as to whether or not the flag is set at 1. If the answer to this question is "yes", then it means that the EGR ratio is too great and the program proceeds to the point 508 where the central processing unit calculates a value NOx(1) estimated for the increase or decrease in the amount of NOx discharged from the engine. This calculation is made based upon the existing engine operating conditions. Following this, the program proceeds to the point 516. If the flag is not set at 1, then the program proceeds from the point 506 to another determination step at the point 510. This determination is as to whether or not the flag is set at 2. If the answer to this question is "yes", then it means that the EGR ratio is the central processing unit calculates a value NOx(1) estimated for the increase or decrease in the amount of NOx discharged from the engine. This calculation is made based upon the existing engine operating conditions. Following this, the program proceeds to the point 516. If the flag is cleared to zero, then it means that the EGR ratio is normal and the program proceeds to the point 514 where the value NOx(1) is set at 0 (zero). Following this, the program proceeds to the point 516.

At the point 516 in the program, the sum S of the data NOx(i) is calculated as

S=ΣNOx(i) where i=1 to n

At the point 518, a determination is made as to whether or not the calculated sum S is greater than an upper limit S3. If the answer to this question is "yes", then the program proceeds to the point 520 where a flag is set at 1 to indicate that an abnormal condition occurs in the EGR system. Following this, the program proceeds to the end point 524. If S≦S3, then it means that no abnormal condition occurs in the EGR system and the program proceeds to the point 522 where the flag is cleared to zero. Following this, the program proceeds to the end point 524.

What is claimed is:

1. In a control apparatus for an internal combustion engine having an intake system for admitting air into a combustion chamber in a cylinder, and an exhaust system for discharging exhaust gases resulting from combustion out of the cylinder, the control apparatus including an exhaust gas recirculation passage admitting a portion of exhaust gases from the exhaust system to the intake system, means for controlling an exhaust gas recirculation ratio in response to a control signal, pressure sensor means for detecting pressure in the cylinder and generating a sensor signal indicative of the detected pressure, and control unit means for determining a target exhaust gas recirculation ratio and generating a control signal indicative of the determined target exhaust gas recirculation ratio in accordance with operating conditions of the engine, the improvement wherein:

the control unit means determines a crankshaft position at which the sensor signal is a maximum based on variation of the sensor signal taking place during the previous combustion in the cylinder;

the control unit means calculates a subtraction of a determined crankshaft position from a target crankshaft position;

the control unit means determines whether the subtraction is positive or negative;

the control unit means determines whether the subtraction is less than a predetermined negative value if the control unit means has determined that the subtraction is negative;

the control unit means decreases a correction factor of the target exhaust gas recirculation ratio by a first value if the control unit means has determined that the subtraction is negative but not less than the predetermined negative value;

the control unit means decreases the correction factor of the target exhaust gas recirculation ratio by a second value that is larger than the first value if the control unit means has determined that the subtraction is negative and less than the predetermined negative value; and the control unit means increases the correction factor of the target exhaust gas recirculation ratio by the first value if the control unit means has determined that the subtraction is positive.

2. In a control apparatus for an internal combustion engine having an intake system for admitting air into a combustion chamber in a cylinder, and an exhaust system for discharging exhaust gases resulting from combustion out of the cylinder, the control apparatus including an exhaust gas recirculation passage admitting a portion of exhaust gases from the exhaust system to the intake system, means for controlling an exhaust gas recirculation ratio in response to a control signal, pressure sensor means for detecting pressure in the cylinder and generating a sensor signal indicative of the detected pressure, and control unit means for determining a target exhaust gas recirculation ratio and generating a control signal indicative of the determined exhaust gas recirculation ratio in accordance with operating conditions of the engine, the improvement wherein:

the control unit means calculates a combustion period from a first crankshaft position at which a spark is produced to a second crankshaft position at which the sensor signal is maximum based on variation of the sensor signal taking place during the previous combustion in the cylinder;

the control unit means detects current operating conditions at which the engine is operating;

the control unit means determines a target window for the detected current operating conditions, the target window having a first limit value and a second limit value that is less than the first limit value;

the control unit means compares the calculated combustion period with the determined target window; and the control unit means modifies a decision table by which operation of the exhaust gas recirculation may be checked in response to the result of comparison of the calculated combustion period with the determined target window.

3. In an internal combustion engine having cylinders, an exhaust system and an intake system, an apparatus for checking an abnormal condition in an EGR system connected to the exhaust system and to the intake system for recirculating exhaust gases from the exhaust system to the intake system, said apparatus comprising:

a sensor operative to sense a predetermined variable representing a condition in only one of the cylinders for producing a sensor signal indicative of the sensed predetermined variable;

combustion period calculating means for calculating a combustion period of combustion taking place in said only one cylinder based on variation in the sensor signal;

means for storing a plurality of predetermined ranges for a plurality of engine operating conditions, each of said plurality of predetermined ranges being defined by upper and lower limit values specified for a corresponding one of said plurality of engine operating conditions;

comparing means for comparing the calculated combustion period with a corresponding one of said predetermined ranges for one of said plurality of engine operating conditions; and means for indicating an abnormal condition in said EGR system in response to a result from comparison by said comparing means.

4. The apparatus as claimed in claim 3, wherein the sensor is a pressure sensor sensitive to a pressure in the corresponding only one of the cylinders for producing a sensor signal indicative of a sensed cylinder pressure, and wherein the combustion period calculation means determines a crankshaft position at which the sensed cylinder pressure reached a maximum.

5. The apparatus as claimed in claim 4, wherein the combustion period calculation means calculates the combustion period as a period from a crankshaft position at which a spark was produced to a crankshaft position at which the sensed cylinder pressure reached the maximum in the corresponding only one of the cylinders.

* * * * *